US010393988B2

(12) United States Patent
Clark

(10) Patent No.: US 10,393,988 B2
(45) Date of Patent: Aug. 27, 2019

(54) CAMERA LENS FILTER WITH TRACTION FRAME

(71) Applicant: Graham Clark, Clark, CO (US)

(72) Inventor: Graham Clark, Clark, CO (US)

(73) Assignee: New Ideas Manufacturing, LLC, Englewood, CO (US)

( * ) Notice: Subject to any disclaimer, the term of this patent is extended or adjusted under 35 U.S.C. 154(b) by 81 days.

(21) Appl. No.: 14/989,507

(22) Filed: Jan. 6, 2016

(65) Prior Publication Data

US 2017/0153408 A1 Jun. 1, 2017

Related U.S. Application Data

(63) Continuation-in-part of application No. 29/546,885, filed on Nov. 27, 2015, now Pat. No. Des. 793,466.

(51) Int. Cl.

*G02B 7/00* (2006.01)
*G03B 11/00* (2006.01)
*G03B 17/14* (2006.01)

(52) U.S. Cl.

CPC .............. *G02B 7/006* (2013.01); *G03B 11/00* (2013.01); *G03B 17/14* (2013.01)

(58) Field of Classification Search

CPC ...... G02B 7/006; G03B 11/00; G03B 17/565; G03B 33/12
USPC .......................................................... 359/361
See application file for complete search history.

(56) References Cited

U.S. PATENT DOCUMENTS 4,390,242 A 6/1983 Tatsumi
4,684,231 A 8/1987 Athy
4,901,098 A 2/1990 Salles
5,040,011 A 8/1991 Tiffen
5,444,507 A 8/1995 Palmer
5,528,328 A 6/1996 O'Farrill
5,537,175 A 7/1996 Kamaya
5,862,428 A 1/1999 An
7,775,671 B2 8/2010 Huang
8,014,666 B2 8/2011 Neiman
8,721,200 B1 5/2014 Cheng
2005/0000776 A1 1/2005 Jigamian
2006/0098307 A1 5/2006 Campean
2007/0013800 A1 1/2007 Pope
2009/0091827 A1* 4/2009 Gauger ................ G03B 11/041 359/511

(Continued)

OTHER PUBLICATIONS

"Zomei 10-stop Neutral Density Filter Review" (bottom photo, p. 7 in PDF), posted at vasphotography.wordpress.com, Aug. 25, 2015. Available from Internet: <https://vasphotography.wordpress.com>.

(Continued)

*Primary Examiner* — Darryl J Collins
*Assistant Examiner* — Journey F Sumlar
(74) *Attorney, Agent, or Firm* — Christopher Pilling

(57) ABSTRACT

A photographic filter comprising a circular support ring; a circular optical filter lens design to selectively transmit light in a range of wavelengths, the circular optical filter lens attached to the circular support ring; a circular traction frame having a plurality of ridges, the circular traction frame circumferentially attached to the circular support ring; and a circular connection means having male threads designed to screw on a front portion of a camera lens having a matching set of female threads.

5 Claims, 4 Drawing Sheets

(56) References Cited

U.S. PATENT DOCUMENTS

| | | | | |
|---|---|---|---|---|
| 2011/0170177 | A1* | 7/2011 | Meissner | B29C 45/14065 359/361 |
| 2013/0242390 | A1* | 9/2013 | Nomura | G02B 27/281 359/483.01 |
| 2013/0265662 | A1* | 10/2013 | Araie | G02B 7/02 359/827 |
| 2014/0140688 | A1 | 5/2014 | Xu | |
| 2015/0153629 | A1 | 6/2015 | Hao | |
| 2015/0332031 | A1 | 11/2015 | Mistry | |
| 2016/0216474 | A1 | 7/2016 | Kobayashi | |

OTHER PUBLICATIONS

"Kiwifotos LA-58SX30 Lens Adapter Ring for Canon PowerShot SX1 IS, SX10 IS, SX20 IS, SX30 IS and SX40 HS" (p. 2 in PDF), posted at cowboystudio.com, Apr. 16, 2015. Available from Internet<http://www.cowboystudio.com/product_p/la-58sx30-lens-adapter-ring.htm>.

"Review: Cokin Pure-Harmonie NO-X Filter" (p. 2 & 3 in PDF), posted at thephoblographer.com, Aug. 21, 2013. Available from Internet: <http://www.thephoblographer.com/2013/08/21/review-cokin-pure-harmonie-nd-x- filter>.

* cited by examiner

CAMERA LENS FILTER WITH TRACTION FRAME

CROSS-REFERENCE TO RELATED APPLICATIONS

This application is a continuation-in-part application which claims priority to design application U.S. Ser. No. 29/546,885, filed Nov. 27, 2015, hereby incorporated by reference.

BACKGROUND OF THE INVENTION

1. Field of the Invention

The present invention relates to camera lens filters, and more specifically a camera lens filter with traction frame.

2. Description of Related Art

In the art of camera lens filters, also called lens filters or photography filters, there has been very limited advancement in the field. In advanced photography practices, photography filters are useful for a variety of reasons. In addition to providing a protective lens for a camera lens, photography filters modify the images captured with a camera, including enhancing color, reducing reflections, or aiding in capturing scenery in extremely difficult lighting conditions.

There are two basic filter designs, circular and square. Circular photography filters screw directly into the threads located on the front of a camera lens, and square photography filters require a circular adaptor for use. Currently, circular photography filters often get stuck on the camera lens or jammed up when stacking more than one filter on the camera lens. The removal of the circular photography filters is difficult, and a filter wrench tool is often needed for successfully removing the photography filter without damaging the camera lens or photography filler itself. This prior art method of removal is illustrated in FIG. 1, and described below. Consequently, there is a need for a camera lens filter that can be removed efficiently and quickly from a camera lens without the need of a filter wrench or other removal tool.

BRIEF SUMMARY OF THE INVENTION

In one embodiment of the present invention a photographic filter is provided, comprising a circular support ring; a circular optical filter lens design to selectively transmit light in a range of wavelengths, the circular optical filter lens attached to the circular support ring; a circular traction frame having a plurality of ridges, the circular traction frame circumferentially attached to the circular support ring; and a circular connection means having male threads designed to screw on a front portion of a camera lens having a matching set of female threads.

In one embodiment, the plurality of ridges aids in grip traction during installation and removal of the photographic filter. In another embodiment, the plurality of ridges comprises a number of equally spaced protruding crests encircling the entire circumference of the circular traction frame. In yet another embodiment, the circular traction frame is constructed from brass. In one embodiment, the circular optical filter lens is an ultraviolet, neutral density, or polarizing lens.

In another aspect to the invention, a camera lens filter is provided, comprising a support ring; an optical filter lens design to selectively transmit light in a range of wavelengths, the optical filter lens attached to the support ring a traction frame having a plurality of ridges, the traction frame attached to the support ring; a connection means having male threads designed to screw on a front portion of a camera lens having a matching set of female threads; the plurality of ridges aids in grip traction during installation and removal of the photographic filter.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a camera lens filter with traction frame aiding in grip traction during installation and removal of the camera lens filter on a camera lens.

Figure 1:
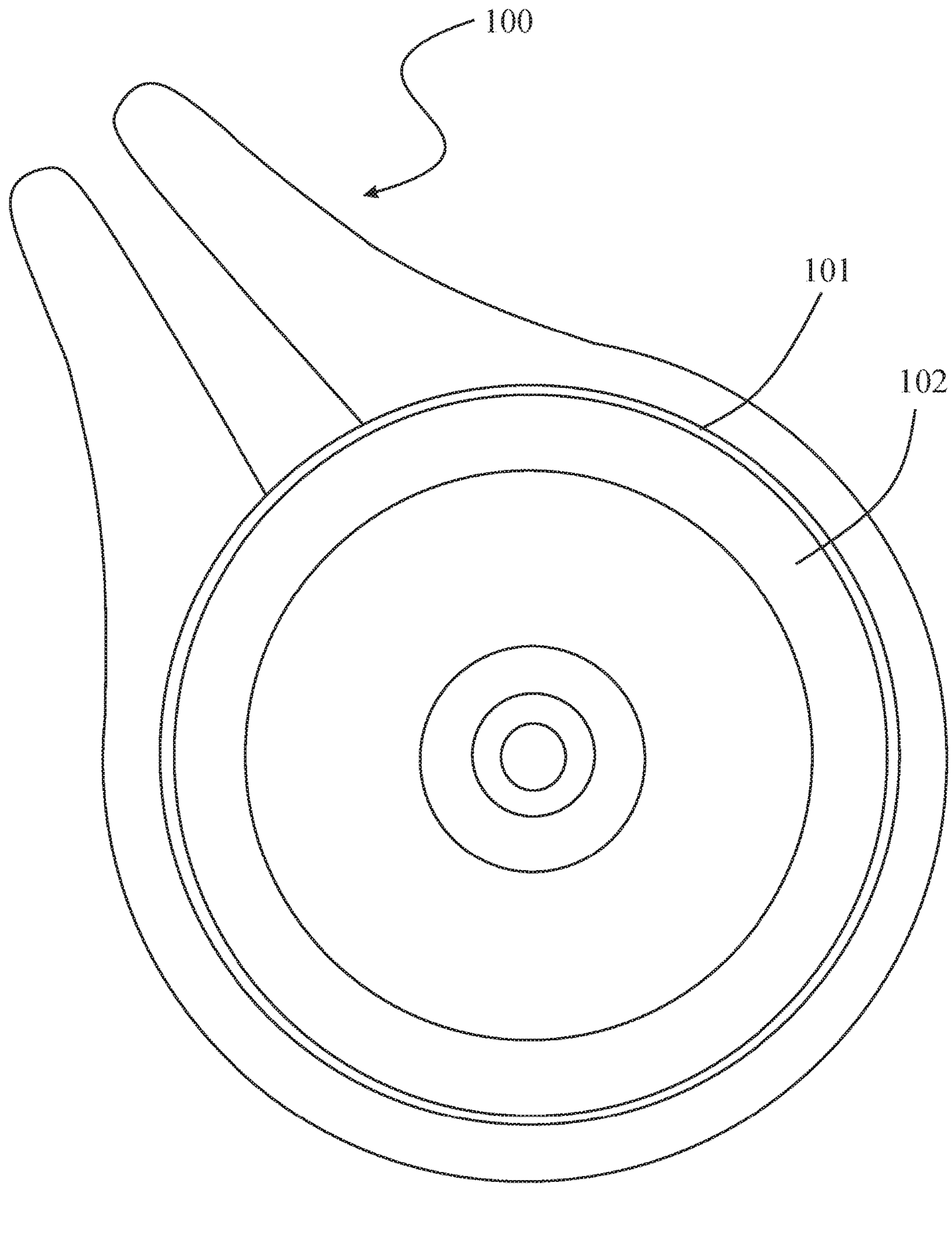
FIG. 1 is a front perspective view of a prior art method for removing a camera lens filter.

FIG. 1 is a front perspective view of a prior art method for removing a camera lens filter. Referring now to FIG. 1, a traditional camera lens filter 101 is installed on a camera lens 102. The camera lens filter is designed to improve the image quality of pictures taken by the camera in which the camera lens is attached. As previously mentioned, it is well known that a camera lens filter often will get stuck on the camera lens making it difficult to remove. During removal a user may break or damage either the camera lens filter or camera lens, as these parts and components are relatively fragile. The current solution to this problem is the use a filter wrench 100. The filter wrench is designed to fit over the camera lens filter as illustrated, allowing a user to use the filter wrench to remove the camera lens filter from the camera lens, as well known in the art.

Figure 2:
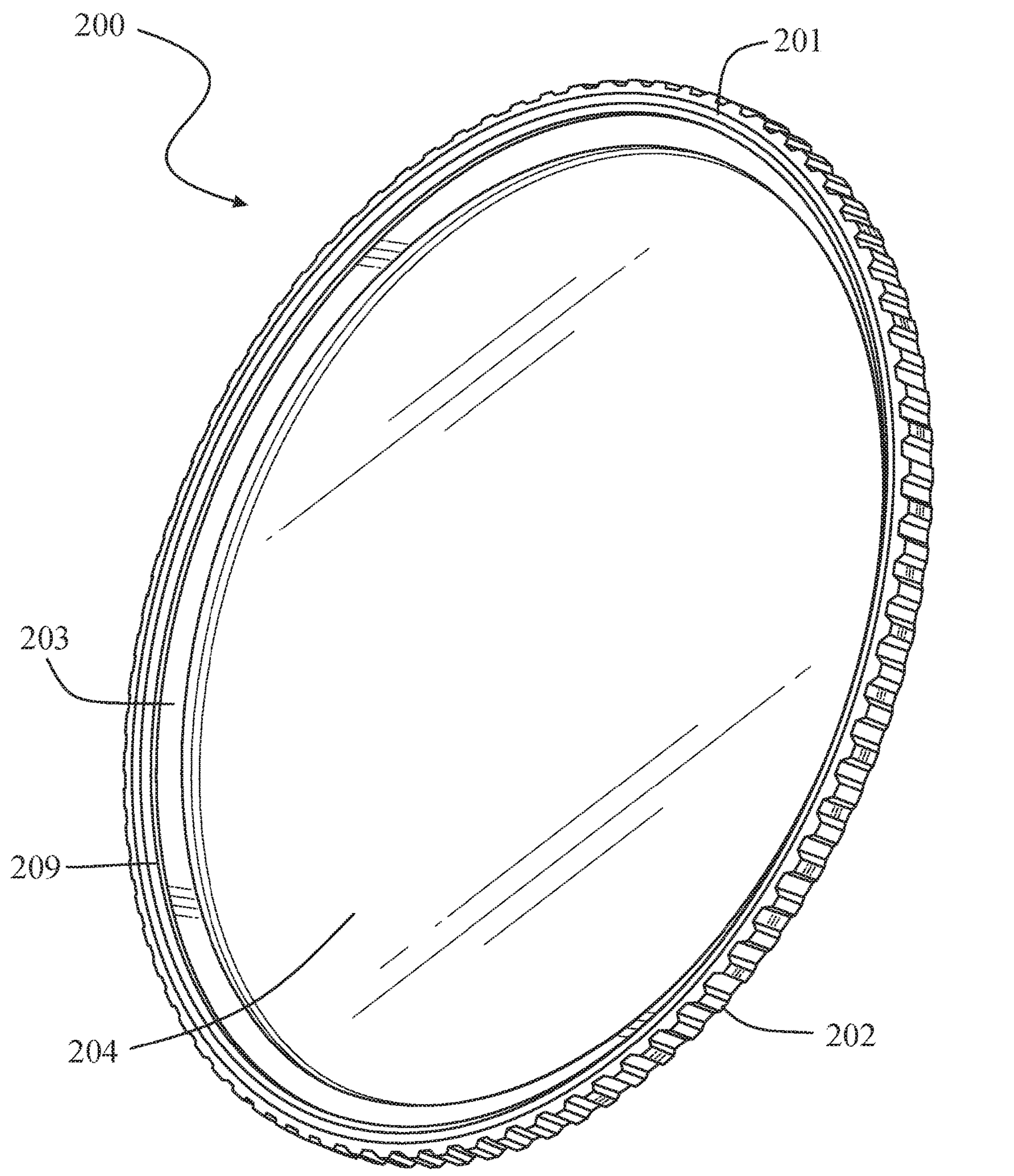
FIG. 2 is a front perspective view of a camera lens filter with traction frame in according to an embodiment of the present invention.

FIG. 2 is a front perspective view of a camera lens filter 200 with traction frame in according to an embodiment of the present invention. Referring now to FIG. 2, the camera lens filter comprises a circular traction frame 201 having a plurality of ridges 202 encircling the entire circumference of the circular traction frame. The traction frame is attached to a circular support ring 203 designed to hold an optical filter lens 204. The circular support ring has a circumferential groove in which the optical filter lens is positioned, as well known in the art. The traction frame and plurality of ridges aids in grip traction during installation and removal of the camera lens filter on and off a camera lens (not illustrated) respectively. This will be described in greater detail below.

During operation, a user may have many different camera lens filters each having a different optical filter lens. This requires the installation and removal of the different camera lens filters. The optical filter lens is designed to selectively transmit light in a range of wavelengths, or colors while blocking remaining colors, as well known in the art. There are many different types of optical filter lens for specific uses including but not limited to ultraviolet (UV), neutral density (ND), polarizing, and infrared (IR) optical filter lenses. The optical filter lens is constructed from glass.

Figure 3:
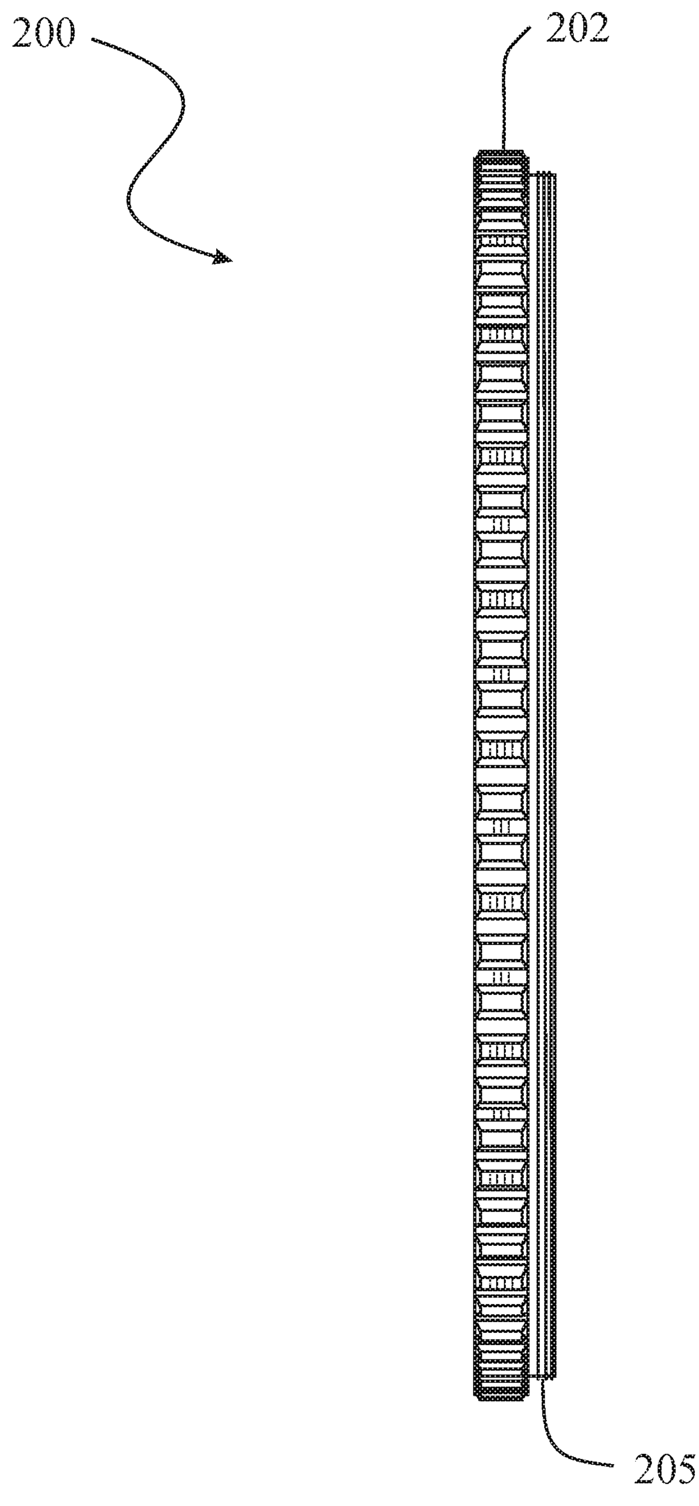
FIG. 3 is a side perspective view of a camera lens filter with traction frame in according to an embodiment of the present invention.

FIG. 3 is a side perspective view of a camera lens filter 200 with traction frame in according to an embodiment of the present invention. Referring now to FIG. 3, the camera lens filter comprises a traction frame 202 as previously mentioned, and a connection means 205. The connection means is circular and has a smaller diameter than the diameter of the traction frame. The connection means consists of male threads designed to screw on a front portion of a camera lens (not illustrated) having a matching set of female threads. The traction frame and plurality of ridges aids in grip traction during installation and removal of the camera lens filter. In some embodiments, the traction frame is constructed from brass and then electroplated with a black matte finish. The black matte finish reduces possible light reflections compared to a natural brass finish. Likewise, in some embodiments, the connection means is also constructed of brass. The brass construction compared with a typical aluminum constructed reduces the tendency for the thread galling, which contributes to the camera lens filter being stuck on an attached camera lens. In some embodiments, the complete camera lens filter is constructed from brass. In alternative embodiments, some components of the camera lens filter may be constructed from aluminum, and more particularly hard anodized aluminum.

Figure 4:
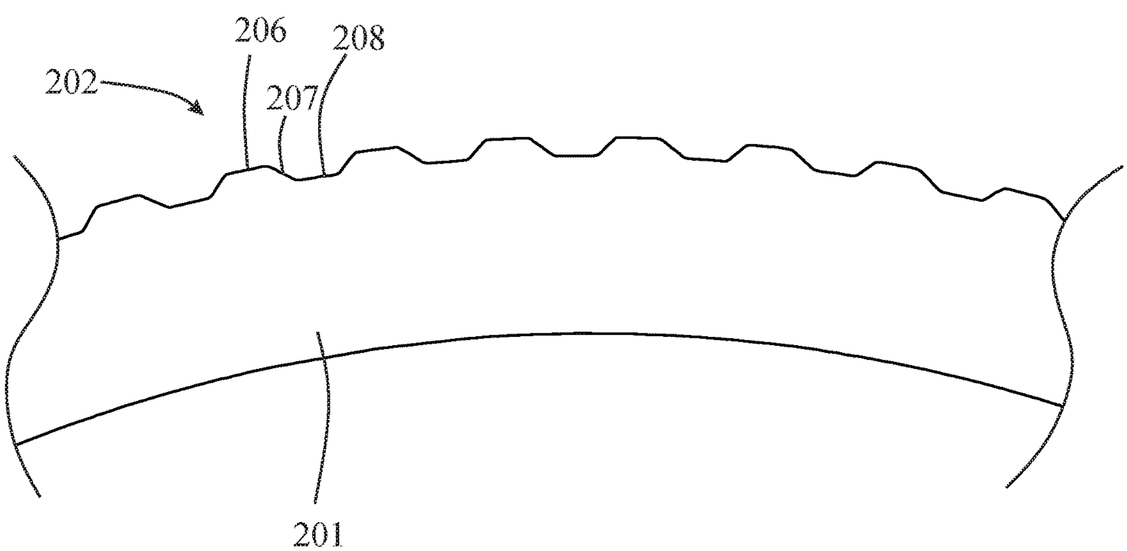
FIG. 4 is a detailed view of a traction frame according to an embodiment of the present invention.

FIG. 4 is a detailed view of a traction frame 201 according to an embodiment of the present invention. Referring now to FIG. 4, the traction frame comprises a plurality of ridges 202 located on the outer portion of the traction frame. Each of the plurality of ridges comprises a crest 206, a ridged surface 207, and a valley surface 208. In some embodiments, the valley surface is in-lined with the circumference surface of the traction frame. In other embodiments, the valley surface is below or shallower than the circumference surface of the traction frame. For simplicity, the circumference surface is the outer or perimeter surface of the traction frame if the plurality of ridges were removed from the camera lens filter. For instance, in some embodiments, the plurality of ridges does not encircle the entire circumference of the traction frame. Thus, the traction frame has an outer diameter that may or may not be equal to the diameter of the valley surface. Further, the valley surface may be constructed of any shape, including but not limited to concave, convex, or flat. Each crest portion of the plurality of ridges has two oppositely opposing ridged surfaces leading from the surrounding valley surfaces connected to each side of the crest. The outer surface of the crest may be constructed of any shape, including but not limited to concave, convex, or flat. In some embodiments, the valley surface and ridged surface is the same surface generally consisting of a convex shape joining two crests.

In some embodiments, the traction frame includes a second threaded portion 209 (FIG. 2), allowing the connection of a second camera lens filter or lens cap to be attached to the first camera lens filter. The principle of attaching multiple camera lens filters to a camera lens is known as stacking. The second threaded portion consists of female threads designed to match the male threads of a corresponding second camera lens filter or lens cap.

The camera lens filter, and more particular the connection means, and second thread portion may be constructed of various sizes, allowing the camera lens filter to attach to various sized camera lenses. The various sizes including but are not limited to 30.5 mm, 37 mm, 40.5 mm, 43 mm, 46 mm, 49 mm, 52 mm, 55 mm, 58 mm, 62 mm, 67 mm, 72 mm, 77 mm, 82 mm, 86 mm, 95 mm, 112 mm and 127 mm.

In some embodiments, the traction frame may include multiple sets of different shaped plurality of ridges, including a first plurality of ridges and a second plurality of ridges. Such that, each of the second plurality of ridges comprises a second crest, a second ridged surface, and a second valley surface. In some embodiments, the first plurality of ridges is adjacent to the second thread portion and the second plurality of ridges is adjacent to the connection means.

Although the invention has been described in considerable detail in language specific to structural features, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. For instance, although a circular camera lens filter is described, the camera lens filter can be modified to be a square or rectangular filter. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A camera lens filter with traction frame comprising:

a circular support ring having a circumferential groove;

a circular optical filter lens design to selectively transmit light in a range of colors while blocking remaining colors, the circular optical filter lens is positioned in the circumferential groove;

a circular traction frame having a first diameter, a front circumferential edge, and a back circumferential edge, wherein the circular traction frame includes a plurality of ridges spanning entirely from the front circumferential edge to the back circumferential edge encircling the entire circumference of the circular traction frame, wherein the circular traction frame is circumferentially attached to the circular support ring, each of the plurality of ridges including a crest, a ridged surface, and a valley surface, wherein the crest has a second diameter, and the second diameter is larger than the first diameter, and a circular connection means having male threads designed to screw on a front portion of a camera lens having a matching set of female threads, wherein the plurality of ridges allows the circular optical filter lens to be removed from the front portion of the camera without the use of a removal tool.

2. The camera lens filter with traction frame of claim 1, wherein the plurality of ridges aids in grip traction during installation and removal of the circular optical filter lens.

3. The camera lens filter with traction frame of claim 1, wherein the circular traction frame is constructed from brass.

4. The camera lens filter with traction frame of claim 1, wherein the circular optical filter lens is an ultraviolet, neutral density, or polarizing lens.

5. A camera lens filter with traction frame comprising:

a circular support ring having a circumferential groove;

a ring-shaped optical filter lens design to selectively transmit light in a range of colors while blocking remaining colors, the circular optical filter lens is positioned in the circumferential groove;

a circular traction frame having a first diameter, a front circumferential edge, and a back circumferential edge, wherein the circular traction frame includes a plurality of ridges spanning entirely from the front circumferential edge to the back circumferential edge encircling the entire circumference of the circular traction frame, wherein the circular traction frame is circumferentially attached to the circular support ring, each of the plurality of ridges including a crest, a ridged surface, and a valley surface, wherein the crest has a second diameter, and the second diameter is larger than the first diameter; and a circular connection means having male threads designed to screw on a front portion of a camera lens having a matching set of female threads, wherein the circular traction frame and the plurality of ridges are exposed and accessible during normal use allowing the ring-shaped optical filter lens to be removed from the front portion of the camera via rotation without the use of a removal tool.

* * * * *